United States Patent
Winkler

(10) Patent No.: US 9,282,587 B2
(45) Date of Patent: Mar. 8, 2016

(54) METHOD FOR MANAGING NOTIFICATIONS IN A COMMUNICATION DEVICE

(71) Applicant: Motorola Mobility LLC, Libertyville, IL (US)

(72) Inventor: David P Winkler, Palatine, IL (US)

(73) Assignee: Google Technology Holdings, LLC, Mountain View, CA (US)

(*) Notice: Subject to any disclaimer, the term of this patent is extended or adjusted under 35 U.S.C. 154(b) by 0 days.

(21) Appl. No.: 13/679,203

(22) Filed: Nov. 16, 2012

(65) Prior Publication Data

US 2014/0141816 A1 May 22, 2014

(51) Int. Cl.
*H04M 1/725* (2006.01)
*H04W 88/02* (2009.01)
*G06Q 10/10* (2012.01)
*H04L 12/58* (2006.01)
*H04W 4/02* (2009.01)

(52) U.S. Cl.
CPC .............. *H04W 88/02* (2013.01); *G06Q 10/10* (2013.01); *G06Q 10/107* (2013.01); *G06Q 10/1093* (2013.01); *H04L 51/24* (2013.01); *H04M 1/72569* (2013.01); *H04L 51/26* (2013.01); *H04L 51/38* (2013.01); *H04M 1/72552* (2013.01); *H04M 2250/60* (2013.01); *H04W 4/028* (2013.01)

(58) Field of Classification Search
CPC ....... H04L 51/24; H04L 51/26; H04L 12/587; H04L 51/38; H04W 4/12; H04W 88/02; H04W 4/02; G06F 17/30029; G06F 17/30038; G06F 17/3053; H04M 1/72519; H04M 1/72552; H04M 1/72569; H04M 2250/60; G06Q 10/107; G06Q 10/109; G06Q 10/06311; G06Q 20/32

USPC .......... 455/412.2, 414.1, 418, 419, 466, 566, 455/412.1, 412, 2; 340/309.7; 709/204, 709/206, 207, 203; 715/788, 789, 795, 811
See application file for complete search history.

(56) References Cited

U.S. PATENT DOCUMENTS 5,828,882 A 10/1998 Hinckley
6,631,363 B1 10/2003 Brown et al.
(Continued)

FOREIGN PATENT DOCUMENTS

EP 1603066 A1 12/2005
EP 1 287 444 B1 7/2007
KR 20100126718 A1 12/2010

OTHER PUBLICATIONS

Priority Notifications Lite, Android Apps on Google Play, https://play.google.com/store/apps/details?id=com.appsubstance.priority notifications&feature=search_result#?t=W251bGwsMSwxLDEsl mNvbS5hcHBzdWJzdGFuY2UucHJpb3JpdHlub3RpZmljYXRpb 25zll0., Mar. 22, 2012.
(Continued)

*Primary Examiner* — Olumide T Ajibade Akonai
(74) *Attorney, Agent, or Firm* — Shumaker & Sieffert, P.A.

(57) ABSTRACT

A method and apparatus of an electronic device for managing notifications is disclosed herewith. The method includes identifying a plurality of notifications associated with one or more electronic devices. The method further determines context data of the plurality of notifications based, at least in part, on their association with at least one remote device. The method then determines an order of display of the plurality of notifications based on the context data. The method further provides the plurality of notifications based on the order of display.

17 Claims, 4 Drawing Sheets

(56) References Cited

U.S. PATENT DOCUMENTS

| | | | |
|---|---|---|---|
| 7,003,525 B1 | 2/2006 | Horvitz et al. | |
| 7,127,394 B2 | 10/2006 | Strong | |
| 7,137,099 B2 | 11/2006 | Knight et al. | |
| 7,139,718 B2 | 11/2006 | Jeyachandran et al. | |
| 7,155,729 B1 | 12/2006 | Andrew et al. | |
| 7,194,681 B1 | 3/2007 | Horvitz | |
| 7,243,130 B2 | 7/2007 | Horvitz et al. | |
| 7,343,365 B2 | 3/2008 | Farnham et al. | |
| 7,457,879 B2 | 11/2008 | Horvitz et al. | |
| 7,565,403 B2 | 7/2009 | Horvitz et al. | |
| 7,743,340 B2 | 6/2010 | Horvitz et al. | |
| 7,797,306 B1 | 9/2010 | Pather et al. | |
| 7,814,055 B2 | 10/2010 | Hullot et al. | |
| 7,844,666 B2 | 11/2010 | Horvitz et al. | |
| 7,975,015 B2 | 7/2011 | Horvitz et al. | |
| 8,024,415 B2 | 9/2011 | Horvitz et al. | |
| 8,082,292 B2 | 12/2011 | Karmakar et al. | |
| 8,086,672 B2 | 12/2011 | Horvitz | |
| 8,166,392 B2 | 4/2012 | Horvitz | |
| 8,332,540 B2 | 12/2012 | Grigsby et al. | |
| 8,347,021 B1 | 1/2013 | Phillips et al. | |
| 8,364,467 B1 | 1/2013 | Bowman et al. | |
| 8,549,441 B2 | 10/2013 | Waldman et al. | |
| 8,707,201 B1* | 4/2014 | Aradhye et al. | 715/789 |
| 2002/0039070 A1 | 4/2002 | Ververs et al. | |
| 2002/0054117 A1 | 5/2002 | Van Dantzich et al. | |
| 2002/0087649 A1 | 7/2002 | Horvitz | |
| 2002/0198946 A1 | 12/2002 | Wang et al. | |
| 2003/0046421 A1 | 3/2003 | Horvitz et al. | |
| 2003/0097485 A1 | 5/2003 | Horvitz et al. | |
| 2003/0101190 A1 | 5/2003 | Horvitz et al. | |
| 2003/0131073 A1 | 7/2003 | Lucovsky et al. | |
| 2003/0212646 A1 | 11/2003 | Horvitz | |
| 2003/0222765 A1* | 12/2003 | Curbow et al. | 340/309.7 |
| 2004/0030753 A1 | 2/2004 | Horvitz | |
| 2004/0037271 A1 | 2/2004 | Liscano et al. | |
| 2004/0061716 A1 | 4/2004 | Cheung et al. | |
| 2004/0128359 A1 | 7/2004 | Horvitz et al. | |
| 2004/0177053 A1 | 9/2004 | Donoho et al. | |
| 2004/0205142 A1 | 10/2004 | Bahr | |
| 2004/0225718 A1 | 11/2004 | Heinzel et al. | |
| 2004/0267730 A1 | 12/2004 | Dumais et al. | |
| 2005/0044500 A1* | 2/2005 | Orimoto et al. | 715/706 |
| 2005/0076013 A1 | 4/2005 | Hilbert et al. | |
| 2005/0091269 A1 | 4/2005 | Gerber et al. | |
| 2005/0132016 A1 | 6/2005 | Boone | |
| 2005/0136903 A1 | 6/2005 | Kashima et al. | |
| 2005/0248437 A1 | 11/2005 | Hellebust et al. | |
| 2005/0267944 A1* | 12/2005 | Little, II | 709/207 |
| 2005/0289180 A1 | 12/2005 | Pabla et al. | |
| 2005/0289470 A1 | 12/2005 | Pabla et al. | |
| 2006/0025159 A1 | 2/2006 | Estevez et al. | |
| 2006/0129947 A1 | 6/2006 | Hamzy et al. | |
| 2006/0259537 A1 | 11/2006 | Emberton et al. | |
| 2007/0168430 A1 | 7/2007 | Brun et al. | |
| 2007/0174768 A1 | 7/2007 | Sen et al. | |
| 2007/0207793 A1* | 9/2007 | Myer et al. | 455/419 |
| 2007/0214228 A1 | 9/2007 | Horvitz et al. | |
| 2007/0214429 A1 | 9/2007 | Lyudovyk et al. | |
| 2007/0288932 A1 | 12/2007 | Horvitz et al. | |
| 2008/0028031 A1* | 1/2008 | Bailey et al. | 709/207 |
| 2008/0046399 A1 | 2/2008 | Goodman et al. | |
| 2008/0125103 A1* | 5/2008 | Mock | 455/418 |
| 2008/0198005 A1 | 8/2008 | Schulak et al. | |
| 2009/0054040 A1 | 2/2009 | Van Wijk et al. | |
| 2009/0089806 A1 | 4/2009 | Mayer | |
| 2009/0172120 A1 | 7/2009 | Ruelas | |
| 2009/0187846 A1 | 7/2009 | Paasovaara | |
| 2009/0276700 A1 | 11/2009 | Anderson et al. | |
| 2010/0049534 A1 | 2/2010 | Whitnah et al. | |
| 2010/0049852 A1 | 2/2010 | Whitnah et al. | |
| 2010/0058231 A1 | 3/2010 | Duarte et al. | |
| 2010/0082693 A1 | 4/2010 | Hugg et al. | |
| 2010/0088378 A1 | 4/2010 | Asawa et al. | |
| 2010/0115530 A1 | 5/2010 | Ahmad et al. | |
| 2010/0122195 A1 | 5/2010 | Hwang et al. | |
| 2010/0211644 A1 | 8/2010 | Lavoie et al. | |
| 2010/0222027 A1 | 9/2010 | Scott et al. | |
| 2010/0228714 A1 | 9/2010 | Carroll | |
| 2011/0053672 A1 | 3/2011 | Gagner et al. | |
| 2011/0076994 A1 | 3/2011 | Kim et al. | |
| 2011/0161427 A1 | 6/2011 | Fortin et al. | |
| 2011/0161987 A1 | 6/2011 | Huang et al. | |
| 2011/0194676 A1 | 8/2011 | Hogan et al. | |
| 2011/0270869 A1 | 11/2011 | Waldron et al. | |
| 2012/0072991 A1 | 3/2012 | Belani et al. | |
| 2012/0077521 A1 | 3/2012 | Boldrev et al. | |
| 2012/0078882 A1 | 3/2012 | Boldyrev et al. | |
| 2012/0084707 A1 | 4/2012 | Abdel-Kader et al. | |
| 2012/0089681 A1 | 4/2012 | Chowdhury et al. | |
| 2012/0149342 A1* | 6/2012 | Cohen et al. | 455/412.2 |
| 2012/0150560 A1 | 6/2012 | Ferguson | |
| 2012/0151383 A1 | 6/2012 | Kazan et al. | |
| 2012/0166277 A1 | 6/2012 | Gnanamani et al. | |
| 2012/0166284 A1 | 6/2012 | Tseng | |
| 2012/0166433 A1 | 6/2012 | Tseng | |
| 2012/0166452 A1 | 6/2012 | Tseng | |
| 2012/0166530 A1 | 6/2012 | Tseng | |
| 2012/0198002 A1 | 8/2012 | Goulart et al. | |
| 2012/0209839 A1 | 8/2012 | Andrews et al. | |
| 2012/0246246 A1 | 9/2012 | Moore | |
| 2012/0295645 A1 | 11/2012 | Yariv et al. | |
| 2012/0304116 A1 | 11/2012 | Donahue et al. | |
| 2012/0304118 A1 | 11/2012 | Donahue et al. | |
| 2012/0323933 A1* | 12/2012 | He et al. | 707/749 |
| 2013/0038437 A1 | 2/2013 | Talati et al. | |
| 2013/0040610 A1 | 2/2013 | Migicovsky et al. | |
| 2013/0130777 A1 | 5/2013 | Lemay et al. | |
| 2013/0132896 A1 | 5/2013 | Lee et al. | |
| 2014/0052488 A1 | 2/2014 | Minder et al. | |

OTHER PUBLICATIONS

Condor et al, "Android fundamentals: Status Bar Notifications," May 9, 2011, retrieved from http://mobile.tutsplus.com/ tutorials/android/ android-fundamentals-status-bar-notifications/, 6 pp.

Holste, "Android SDK: Using Alerts, Toasts and Notifications," Jul. 20, 2010, retrieved from http://mobile.tutsplus.com/ tutorials/android/androis-sdk-alert/, 6 pp.

McCrickard et al., "A Model for Notification Systems Evaluation—Assessing User Goals for Multitasking Activity," ACM Transactions on Computer-Human Interaction, vol. 10, No. 4, Dec. 4, 2003, pp. 312-338.

Whitney, "Vibration Examples for Android Phone Development," Mar. 27, 2010, retrieved from http://android.konreu. com/developer-how-to/vibration-examples-for-android-phone-development/, 8 pp.

"Add or remove a reminder for a message or contact," Retrieved from http://office.microsoft.com/en-us/outlook-help/add-or-remove-a-reminder-for-a-message-or-contact-HP001234154.aspx, accessed on Sep. 24, 2012, 2 pp.

Google Play, "Call Reminder Notes by Finmouse," Retrieved from http://play.google.com/store/apps/details?id=com.finmouse.android.callremindernoteslite&feature=search_result, Aug. 27, 2012, 2 pp.

Google Play, "Finmouse Working Smart," Retrieved from http://www.finmouse.com/, accessed on Sep. 24, 2012, 1 p.

LeFebvre, "Set Up a Location-Based Reminder With Maps, [iOS Tips]," Retrieved from http://www.cultofmac. com/168346/set-up-location-based-reminder-with-maps-ios-tips/, May 23, 2012, 4 pp.

Girardello, et al. "Explicit and Implicit Ratings for Mobile Applications," in GI Jahrestagung (1), pp. 606-612, 2010.

International Search Report and Written Opinion of international application No. PCT/US2013/66299, dated Dec. 4, 2015, 17 pp.

International Preliminary Report on Patentability from International Application No. PCT/US2013/066299, mailed May 28, 2015, 6 pp.

* cited by examiner

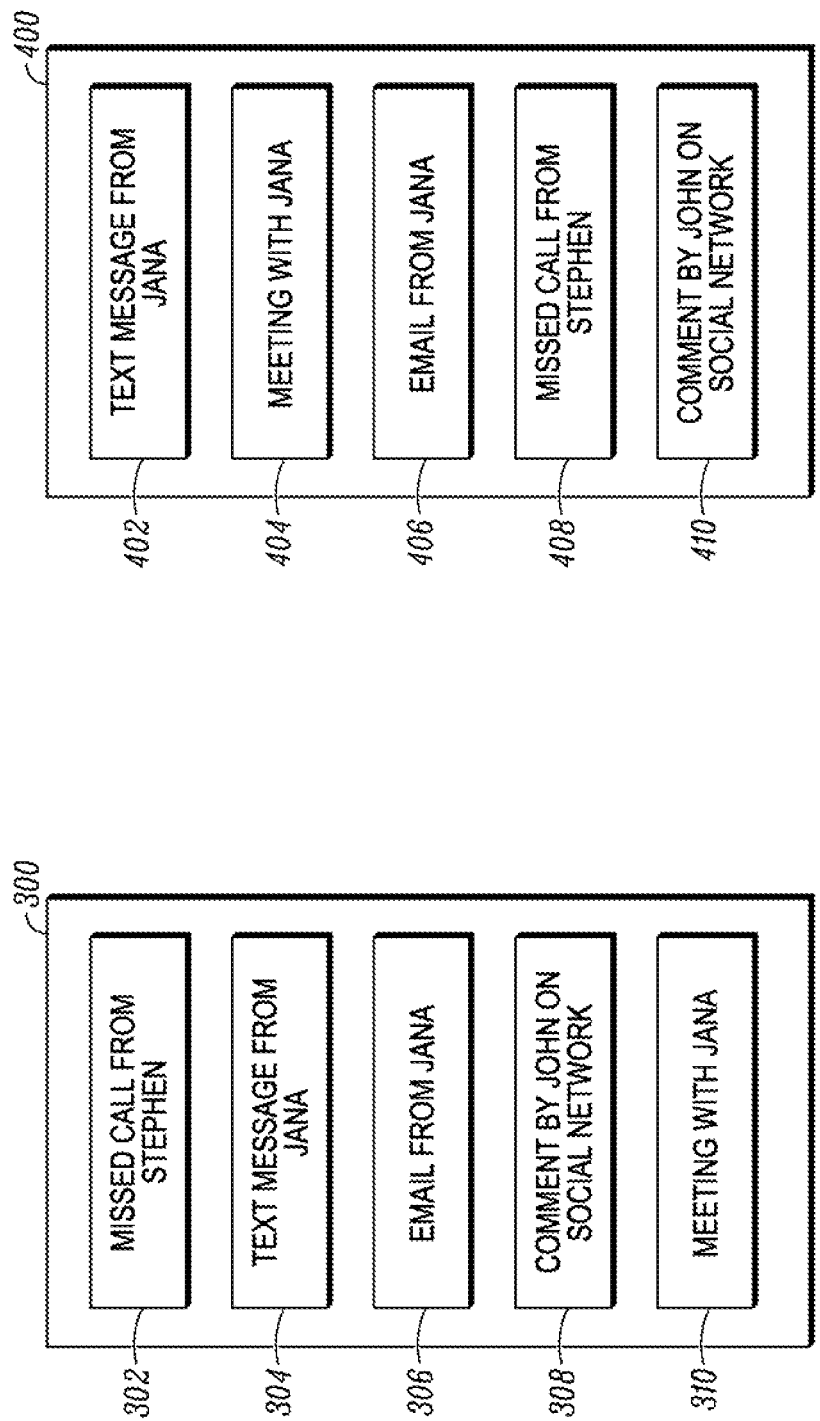

METHOD FOR MANAGING NOTIFICATIONS IN A COMMUNICATION DEVICE

FIELD OF THE DISCLOSURE

The present disclosure relates generally to a communication device and more particularly to a method for managing notifications in the communication device

BACKGROUND

Communication devices have access to a wide range of data from the world around them. Users receive various calls, messages, emails, and various updates from various sources. Many operating systems in the communication devices use notifications to alert users about various events from various sources. Conventionally, notifications in various operating systems are handled in a chronological fashion, i.e., with the most recent one at the top and the others following from there in order of decreasing order by time. However, when there are so many notifications on a communication device, it is possible that the user misses out on important or extremely relevant notifications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is an arrangement of the notifications in the electronic device without being ordered in accordance with embodiments of the present invention.

FIG. 4 is an arrangement of the notifications in the electronic device in accordance with some embodiments of the present invention.

Figure 1:
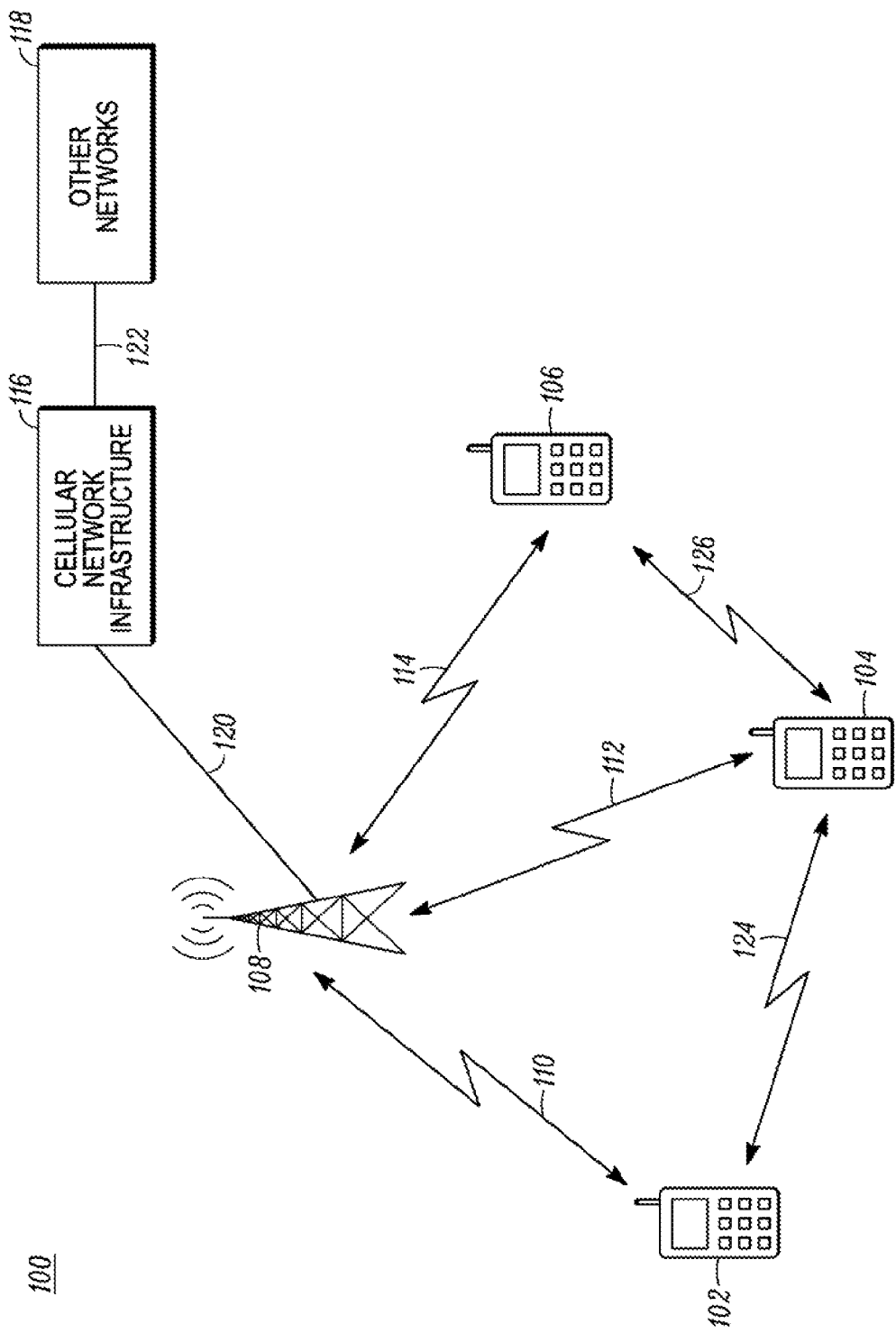
FIG. 1 is a block diagram of a communication system in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before describing in detail the particular method and system for managing notifications in an electronic device, in accordance with an embodiment of the present disclosure, it should be observed that the present disclosure resides primarily in combinations of method steps and apparatus components related to the method and system for managing notifications in the electronic device. Accordingly, the apparatus components and method steps have been represented where appropriate by conventional symbols in the drawings, showing only those specific details that are pertinent to understanding the present disclosure, so as not to obscure the disclosure with details that will be readily apparent to those of ordinary skill in the art, having the benefit of the description herein.

A method of an electronic device for managing notifications is disclosed herewith. The method includes identifying a plurality of notifications associated with one or more electronic devices. The method further determines context data of the plurality of notifications based, at least in part, on their association with at least one remote device. The method then determines an order of display of the plurality of notifications based on the context data. Next, the method provides the plurality of notifications based on the order of display.

FIG. 1 illustrates a schematic of a wireless communication system 100 in accordance with some embodiments of the present invention. The wireless communication system 100 includes one or more electronic devices 102, 104, 106 communicating with one or more base stations 108, a cellular network infrastructure 116 and other networks 118 communicating with the base station 108 via wireless or wired link 120. Examples of wired links include landline connections, such as fiber optic or conductive wiring connections and the like, and examples of wireless links include Bluetooth, Zigbee, near field communication, infrared, peer-to-peer WiFi, and the like, depending upon the embodiment or device that is involved.

In accordance with the embodiment, the base station 108 in the wireless communication system 100 is configured to operate according to any of a number of different communication technologies including, but not limited to, 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies. The base station 108 communicates with the electronic devices 102-106 via the wireless or wired links 110, 112, 114. The wired or wireless links 110-114 are intended to be representative of a variety of other wireless or wired links including landline connections such as fiber optic or conductive wiring connections, microwave communications, radio channel communications, and/or wireless path communications depending upon the embodiment or device that is involved.

In accordance with the embodiment, besides the cellular communications discussed above, peer-to-peer or wireless ad-hoc communications may also be used by the electronic devices 102-106. The electronic devices 102-106 may communicate with each other via wireless links 124, 126. The wireless links 124, 126 are intended to be representative of a variety of other wireless links including Zigbee, near field communication, infrared, peer-to-peer WiFi, and the like, depending upon the embodiment or device that is involved.

Still referring to FIG. 1, an electronic device 102-106 is intended to be representative of any of a variety of wireless communication devices operated by users or possibly by other entities (e.g., other computers) desiring or requiring communication capabilities. In some embodiments, for example, the electronic device 102-106 can be any of a call receiver, a cellular telephone, a personal digital assistant (PDAs), a smart phone, a messaging device, a mobile data terminal, a wireless communication device, another handheld or portable electronic device, a headset, a MP3 player, a battery-powered device, a wearable device, a radio, a navigation device, a computer (such as a laptop computer, a notebook computer, a desktop computer or a hand-held computer), a notebook, a pager, a PMP (personal media player), a DVR (digital video recorder), a gaming device, a camera, a notebook, an e-reader, an e-book, a tablet device, a navigation device with a video capable screen, a multimedia docking station, or similar mobile or communicating device. The electronic device 102-106 may be served by the base station 108.

The cellular network infrastructure 116 may be connected to the various other elements in the wireless communication system 100 and other networks 118. For example, the cellular network infrastructure 116 may be connected to the electronic devices 102-106 through the base station 108 serving the electronic devices 102-106. The cellular network infrastructure 116 may route the communications to electronic devices 102-106 via base station 108 or via a PSTN/Internet/other network elements. The cellular network infrastructure 116 may communicate with the other networks 118 via wireless or wired link 122. The wireless or wired link 122 are intended to be representative of a variety of other wireless or wired links including landline connections such as fiber optic or conductive wiring connections, microwave communications, radio channel communications, and/or wireless path communications depending upon the embodiment or device that is involved.

Further, it is to be understood that FIG. 1 is provided merely for the purpose of illustrating the principles of the present invention. FIG. 1 is not intended to be a comprehensive schematic diagram of all of the components of such a communication system. Therefore, wireless communication system 100 may comprise various other configurations and still be within the scope of the present disclosure.

Figure 2:
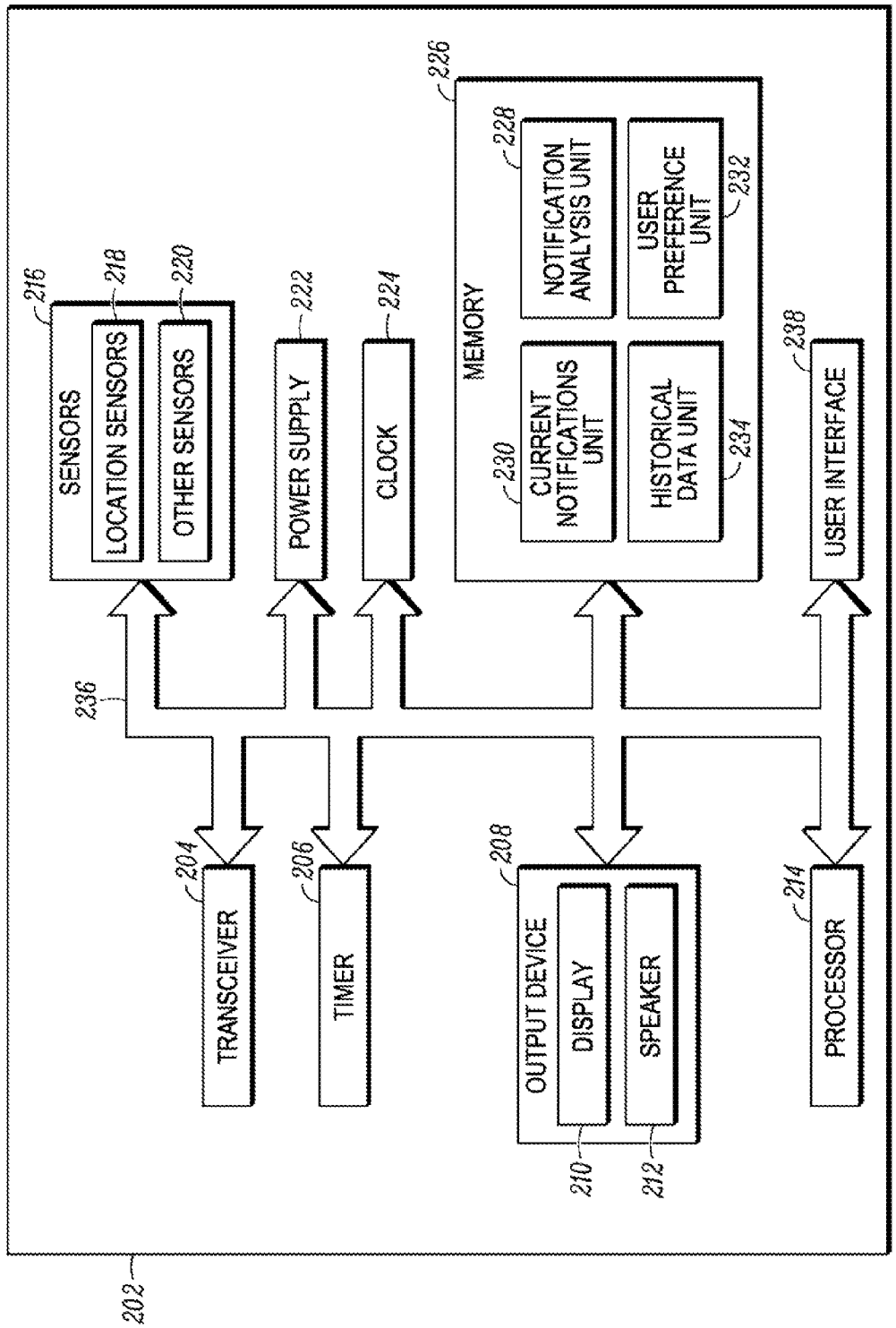
FIG. 2 is a schematic of an electronic device in accordance with some embodiments of the present invention.

Referring to FIG. 2, there is provided a block diagram 200 illustrating example internal hardware components of the electronic device 102-106 of FIG. 1. For the purposes of the explanation below, the block diagram 200 will be referred to as describing internal hardware components of a communication device 202. Herein, the communication device 202 refers to the electronic device 102-106.

The block diagram 200 of the communication device 202 includes various components. The example components may include a transceiver 204, a timer 206, an output device 208 including a display 210 and a speaker 212, a processor 214, sensors 216 including locations sensors 218 and other sensors 220, a power supply 222, a clock 224, a memory 226, and a user interface 238. Herein, the memory 226 may further include a notification analysis unit 228, a current notifications unit 230, a user preference unit 232, and a historical data unit 234. Herein, components 204-234 may be capable of communicating with one or more components of the communication device 202. For example, as shown in FIG. 2, all components are coupled to a bidirectional system bus 236, having one or more of a data communication path, a control communication path or a power supply path.

In accordance with an embodiment, the transceiver 204 may be implemented as one or more transmitting and receiving components of the communication device 202. The transceiver 204 enables the communication device 202 to transmit and receive the signals through an antenna (not shown). In accordance with the embodiment, the transceiver 204 converts the signals received from the antenna to digital data for use by the processor 214. Each transceiver 204 utilizes wireless technology for communication such as, but are not limited to, but are not limited to, peer-to-peer or ad hoc communications such as Bluetooth, Zigbee, near field communication, infrared, peer-to-peer Wifi, wireless HDMI, wireless USB, HomeRF, and the like. Each transceiver 204 may also utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants.

The output device 208 may generate visual indications of data generated during operation of the processor 214. The visual indications may include prompts for human operator input, calculated values, detected data, etc. Additionally, the output device 208 may include a video output component such as a display device 210 which may include one or more of a cathode ray tube, a liquid crystal display, a plasma display, an incandescent light, a fluorescent light, a front or rear projection display, or a light emitting diode indicator. Other examples of output components 208 include an audio output component such as a speaker 212, alarm and/or buzzer, and/or a mechanical output component such as vibrating or motion-based.

In accordance with an embodiment, the user interface 238 may be connected to the processor 214 for entering data and commands in the form of text, touch input, gestures, etc. The user interface 238 is, in one embodiment, a touch screen device but may alternatively be an infrared proximity detector or any input/output device combination capable of sensing gestures and/or touch including a touch-sensitive surface. In addition, the user interface 238 may include one or more additional components, such as a video input component such as an optical sensor (for example, a camera), an audio input component such as a microphone, and a mechanical input component such as button or key selection sensors, a touch pad sensor, another touch-sensitive sensor, a capacitive sensor, a motion sensor, and/or a pointing device such as a joystick and buttons used on laptop or notebook computers, a track ball, a touch pad, a rocker switch, a touch screen, a TTY input device for disabled persons, a Braille key input, or a pad for an electronic stylus, for example. The user interface 238 enables a user of the communication device 202 to provide an input for the communication device 202.

Still referring to FIG. 2, the memory 226 may be used to store data and instructions for the operation of the processor 214. In the various embodiments, the memory 226 may be one or more separate components and/or may be partitioned in various ways for various purposes such as but not limited to, optimizing memory allocations, etc. Thus, it is to be understood that the example memory 226 illustrated in FIG. 2 are for illustrative purposes only, for the purpose of explaining and assisting one of ordinary skill in understanding the various embodiments described herein. The memory 226 may include a current notifications unit 230. The current notifications unit 230 may include notifications from various sources. The notifications in the current notifications unit 230 may comprise at least one of a call notification, a message notification, an update notification, a calendar notification, an email notification, or notifications from websites. The current notifications unit 230 may include recently received notifications. For example, the current notifications unit 230 may include the notifications which have not been yet checked by a user of the communication device 202.

The memory 226 may further include a notification analysis component 228. The notification analysis unit 228 may store arranged and ordered notifications in accordance with some embodiments of the present invention. Further, the memory 226 may include a user preference unit 232. Users may give high priority or preferences to certain individuals.

For example, a user may prefer emails or messages from wife or boss to be given high priority. Likewise, various user preferences are stored in the user preference unit 232.

The memory component 226 may also include a historical data unit 234. The historical data unit 234 may include historical data of the user. The historical data may further include one or more of location data, a calendar event, a message, recently visited websites, recently called numbers, browsing history, and the like. Further, location data may be based on data from location sensors 218. Further, the message may include email text messages, SMS messages, IM messages, MMS messages, and various other messages from various sources.

Further, the power supply 222, such as a battery, may be included in the internal components of the communication device 202 for providing power to the other internal components while enabling the communication device 202 to be portable.

Further, sensors 216 may be included in the internal components of the communication device 202. Sensors 216 may include location sensors 218 and other sensors 220. Location sensors 218 may sense and provide location data of the user's communication device 202. Other sensors 220 may include one or more of proximity sensors, ambient light sensor, accelerometer, and the like. Data from the sensors 216 may be stored in memory 226.

Further, the processor 214 operates in conjunction with the data and instructions stored in the memory 226 to control the operation of the communication device 202. The processor 214 may be implemented as a microcontroller, a digital signal processor, hard-wired logic and analog circuitry, or any suitable combination of these.

It is to be understood that FIG. 2 is for illustrative purposes only and is primarily for, although not solely for, explaining the information stored in memory for the various embodiments of an electronic device in accordance with the present disclosure, and is not intended to be a complete schematic diagram of the various components and connections there between required for an electronic device. Therefore, a communication device will comprise various other components not shown in FIG. 2, and/or have various other internal and external configurations, and still be within the scope of the present disclosure. Also, one or more of these components may be combined or integrated in a common component, or components features may be distributed among multiple components. Also, the components of the communication device 202 may be connected differently, without departing from the scope of the invention.

Finally, as mentioned above, FIG. 2 can also be considered to be equally or substantially equally representative of the internal components of one or more electronic devices 102-106.

Referring to FIG. 3, there is diagram illustrating example arrangement of the notifications 302, 304, 306, 308, and 310 without or before being ordered in accordance with some embodiments of the present invention. This arrangement may or may not be used or shown by the electronic device 102 and is provided to explain a particular operation of the device as represented by FIG. 4. The arrangement 300 displays the arrangement of notifications 302-310 in a chronological fashion. Particularly, FIG. 3 describes arrangement of notifications 302-310 in their order of occurrence in time.

The arrangement 300 may include various notifications 302-310 received at the electronic device 102-106 from various sources. The example notifications 302-310 may include notifications like missed call from Stephen 302, text message from Jana 304, email from Jana 306, comment by John on social network 308, and meeting with Jana 310. The example notifications 302-310 are arranged in their order of occurrence in time. Particularly, in the arrangement 300, the most recent notification is arranged on top. In the present example, first meeting with Jana is received, followed by comment by John on social network, followed by email from Jana, further followed by text message from Jana, and then followed by missed call from Stephen. Particularly, the most recent notification i.e., missed call from Stephen may be arranged on top in the arrangement 300. In such type of scenario, as described with respect to FIG. 3, a user of the electronic device 102-106 may miss certain important notification just because they were not up the order or not prioritized, but were more relevant to the user. In an example, a notification may be relevant to the user, but received earlier than some other notifications, may be arranged down the order and, as a result, the user may eventually miss the relevant notification. This may cause inconvenience to the user of the electronic device 102-106.

Referring to FIG. 4, there is diagram illustrating example arrangement of the notifications 402, 404, 406, 408, and 410 in the electronic device 102-106 in accordance with some embodiments of present invention.

A user of the electronic device 102-106 may consider notifications associated with some other users, some contexts, or some events to be of more relevance than others. In that scenario, the user of the electronic device 102-106 may assign weights to various user, contexts, or events. This assignment of weights may be further used to arrange notifications 402-410. This type of arrangement may move the notifications, which the users think are more relevant, up the order. This will reduce the chances of missing out on relevant notifications by the user.

In accordance with some embodiments of the present invention, the user of an electronic device 102-106 can assign weights to various contexts associated with the electronic device 102-106 and other data sources. The management of notifications 402-410 may be based on the assigned weights. Further, various contexts may be alerts from a particular person (as preferred by the user), text messages, meetings, emails, missed calls, and notifications from social networking sites, and the likewise in accordance with user selected preferences. Further, in an example, weights to the various contexts may be assigned as follows: Alerts from Jana—1, Text messages—1, Meetings—0.75, Emails—0.5, Missed calls—1, and Notifications from social networking sites—0.5. An arrangement 400 for the notifications 402-410 in accordance with some embodiments of the present invention is shown in FIG. 4. The arrangement 400 may be based on the weights assigned to various contexts. For all the notifications 402-410, a net weight may be calculated and the notifications 402-410 may be arranged in accordance with calculated net weights. Notifications 402-410 may be arranged in decreasing order of their calculated net weights. A notification with the highest calculated net weight may be arranged at the top of the arrangement 400 and a notification with the lowest calculated weight may be arranged at the bottom of the arrangement 400.

TABLE 1

| Sr. no. | Notification | Contexts considered | Net weight | Order of display |
|---|---|---|---|---|
| 1 | Missed call from Stephen | "Missed calls" | 1 | 4 |

TABLE 1-continued

| Sr. no. | Notification | Contexts considered | Net weight | Order of display |
|---|---|---|---|---|
| 2 | Text message from Jana | "Alerts from Jana" + "Text messages" | 1 + 1 = 2 | 1 |
| 3 | Email from Jana | "Alerts from Jana" + "Emails" | 1 + 0.5 = 1.5 | 3 |
| 4 | Comment by John on Social network | "Notifications from social networking sites" | 0.5 | 5 |
| 5 | Meeting with Jana | "Alerts from Jana" + "Meetings" | 1 + 0.75 = 1.75 | 2 |

In Table 1, net weights are calculated for all the notifications 402-410 received on the electronic device 102-106. For example, for the notification "Missed call from Stephen", the net weight may be the weight associated with the context "Missed calls" i.e., 1, for the notification "text message from Jana", the net weight may be sum of weights associated with the contexts "Alerts from Jana" and "Text messages" i.e., 1+1=2, for the notification "email from Jana", the net weight may be sum of weights associated with the contexts "Alerts from Jana" and "Emails" i.e., 1+0.5=1.5, for the notification "Comment by John on Social network", the net weight may be the weight associated with the context "Notifications from social networking sites" i.e., 0.5, and for the notification "meeting with Jana", the net weight may be sum of weights associated with the contexts "Alerts from Jana" and "Meetings" i.e., 1+0.75=1.75. In Table 1, the net weights are calculated by analyzing which notification may be associated with which contexts. For example, the notification "text message from Jana" indicates a message and an alert from a particular person, therefore, the notification "text message from Jana" may be associated with the contexts "Alerts from a particular person" and "Text messages". And accordingly, the net weight for the notification "text message from Jana 314" may calculated by summing up the assigned weights for the contexts "Alerts from a particular person" and "Text messages".

In accordance with some embodiments of the present invention, in Table 1, the notification with the highest net weight i.e., "Text message from Jana" holds the top most position in the arrangement 400 and the notification with the lowest net weight i.e., "comment by John on Social network" holds the lowest position in the arrangement 400. All other notifications in the Table 1 are also ordered as per their calculated net weights. By managing notifications in this way, the user is able to see the notification of his/her preference on top and there is least chance of missing out on important notifications.

In FIG. 3, "missed call from Stephen" is at the top and "meeting with Jana" is at the bottom of the arrangement 300. However, when the management of the notifications is done in accordance with the embodiments of the present invention and as described in FIG. 4, "text message from Jana" holds the top position and "comment by John on social network" holds the bottom position in the arrangement 400. In FIG. 4, "missed call from Stephen" and "meeting with Jana" are moved to fourth and third position respectively. In this way, in FIG. 4, the notifications which are more relevant to the user of the electronic device 102-106 are ordered ahead of other notifications. Further, it is to be understood that the example arrangements illustrated in FIG. 3 and FIG. 4 are for illustrative purposes only, for the purpose of explaining and assisting one of ordinary skill in understanding the various embodiments described herein.

Figure 5:
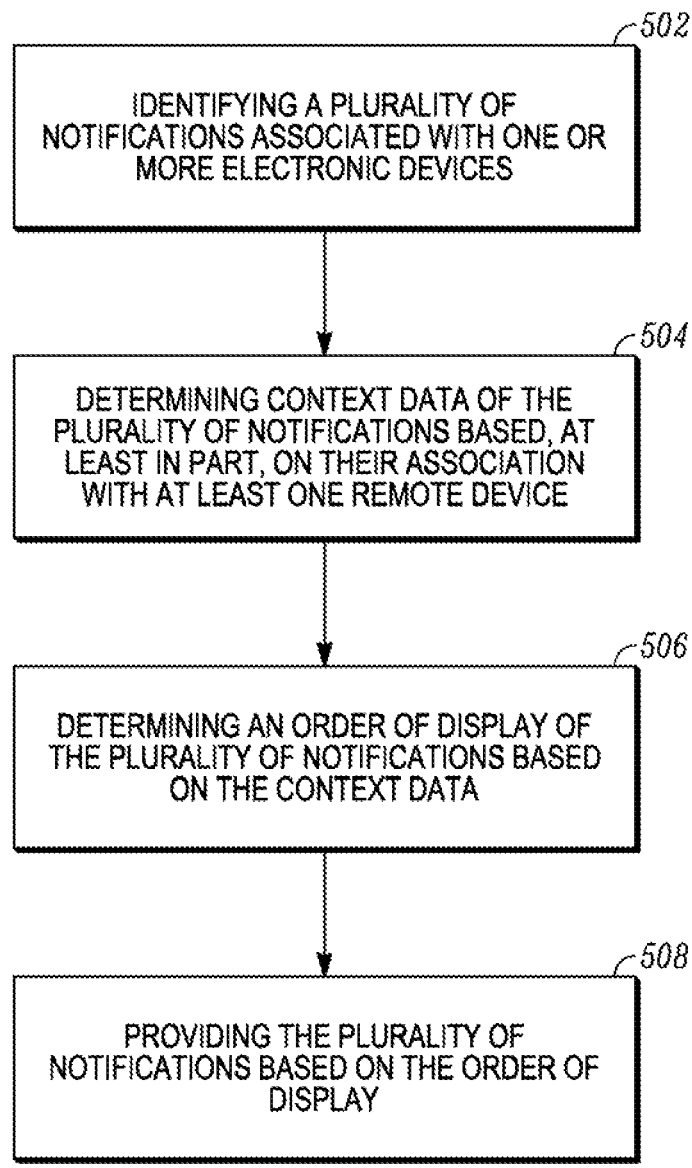
FIG. 5 is a flowchart of a method in accordance with some embodiments of the present invention.

FIG. 5 is a flowchart for a method 500 for managing notifications at the electronic device 102-106. Referring to FIG. 5, the method 500 begins with a step of identifying 502, by a processor 214, a plurality of notifications associated with one or more electronic devices 102-106. Herein, identifying a plurality of notifications may comprise identifying one or more of a call notification, a message notification, an update notification, a calendar notification, an email notification, or notifications from websites. Particularly, the processor 214 identifies a plurality of notifications associated with one or more electronic device 102-106.

The method 500 then moves to step of determining 504, by the processor 214, context data of the plurality of notifications based, at least in part, on their association with at least one remote device. In one example, the remote device or devices refer to electronic device 104 and the electronic device refers to the electronic device 102. In another example, the remote device(s) may be one or more of electronic devices 102-106, other than electronic device 102-106 at which the context data is being determined Further, the context data may include one or more of a location data, time, a calendar event, a message, call answering statistics, a recently visited website, a recent search term, a recently called number, or browsing history. Herein, the location data may be based on data from location sensor 218. Herein, the call answering statistics may be related to user's patterns of answering, ignoring, or rejecting calls from specific individuals. Herein, the user's patterns may include ways in which the user responds to calls from the specific individuals. The call answering statistics may also be based on the time the user takes to answer calls from specific individuals. In an example, a user mostly picks up a call from a first friend very quickly (for e.g., in 3-7 seconds) and mostly rejects calls from another friend. In this example, the two ways in which the user responds may correspond to information pertaining to call answering statistics. This information about the user's call answering statistics may further be used as context data to determine order of display of notifications.

In another example, the context data may be further associated with the user's recently visited places. In another example, the context data may be associated with the location of meeting i.e., the combination of the location data and the calendar event. In yet another example, the context data may be based on emails having some information related to the user's visited places over the last weekend.

In accordance with the embodiments of the present invention, the step 504 of determining context data may also include associating each notification of the plurality of notifications with at least one remote device, for example, electronic device 104, and identifying one or more contextual events associated with remote device(s), for example, electronic device 104. In one example, identifying one or more contextual events associated with the remote device(s); for example, electronic device 104, may include identifying a communication associated with the user's electronic device 102 and the remote device(s), for example, electronic device 104. In another example, identifying one or more contextual events associated with the remote device(s) may also include identifying a scheduled event associated with the electronic device 102-106 and the remote device(s).

The method 500 then moves to step of determining 506, by the processor 214, an order of display of the plurality of notifications based on the context data. Herein, determining an order of display of the plurality of notifications based on the context data may include determining the order of display of the plurality of notifications based upon one or more of the context data and a sensor data. Herein, the sensor data may include data from a location sensor 218 or other sensors 220.

The step 506 may further include prioritizing at least one notification ahead of at least one other notification of the plurality of notifications based on the context data. The step 506 may further include assigning weights to one or more contextual events associated with the remote device(s), for example, electronic device 104. Further, a net weight may be calculated for the plurality of received notifications based on the weights assigned to the contextual event(s). Further, the order of display of the plurality of notifications may be based on the calculated net weight. In an example, notifications may be arranged in the decreasing order of their calculated net weights. In that, a notification with the highest calculated net weight may be arranged on the top of the order of the display and a notification with the lowest calculated weight may be arranged at the bottom of the order of display.

In one example, contextual events may be alerts from a particular user, recently visited location, and recently searched items. Herein, the contexts may be assigned weights as: alerts from an important person—1, recently visited location—0.5, and recently searched items—0.75. In this example, let us assume that three notifications are received. The received three notifications may include a message from user's best friend, an email from user's best friend having some data related to fights between Chicago and New York, and an advert email about colleges in New York. In this scenario, let us consider that user's best friend may be an important person to the user and further the user lives in Chicago and recently searched about flights between Chicago and New York and life in New York. In that case, the net weight of the message from user's best friend may be 1 (alerts from a important person), the net weight of the email from user's best friend having some data related to fights between Chicago and New York may be 2.25 (1(alerts from a important person i.e., user's best friend)+0.5 (recently visited location, i.e., user's current location Chicago)+0.75 (recently searched items i.e., flights between Chicago and New York)), and the net weight of the advert email about colleges in New York may be 0.75 (recently searched items i.e., life in New York). In this case, the notification with highest net weight i.e., email from user's best friend having some data related to fights between Chicago may be arranged on the top of the order of display and the notification with lowest net weight i.e., advert email about colleges in New York may be arranged at the bottom of the order of display.

The method 500 then moves to step of providing 508, by the processor 214, the plurality of notifications based on the order of display. In an example, the processor 214 displays the plurality of notifications on the display 210 based on the determined order of display.

The method 500 for managing notifications at the electronic device 102-106 may help the user of the electronic device 102-106 to prioritize notifications in accordance with the user's needs or preferences. The user may avoid missing on important notifications because the notifications on the electronic device 102-106 are ordered and displayed in accordance with the user's preferences.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
   identifying, by an electronic device, a plurality of notifications;
   determining, by the electronic device, for each respective notification of the plurality of notifications, respective context data wherein a respective priority of at least one respective notification of the plurality of notifications is based on at least one respective weight assigned to the respective context data, wherein the respective context data for the at least one notification of the plurality of notifications is based, at least in part, on a contextual event, the contextual event being at least one of:
      a scheduled event associated with the electronic device and the one or more remote electronic devices, or
      a communication received at both the electronic device and the one or more remote electronic devices;
   determining, by the electronic device, an order of display of the plurality of notifications based on the at least one respective weight of the respective context data for the at least one respective notification of the plurality of notifications; and
   outputting, by the electronic device and for display, the plurality of notifications based on the order of display.

2. The method of claim 1, wherein identifying the plurality of notifications comprises identifying at least one of a call notification, a message notification, an update notification, a calendar notification, an email notification, or notifications from websites.

3. The method of claim 1, further comprising detecting sensor data associated with at least one sensor located at the electronic device.

4. The method of claim 3, wherein determining the order of display of the plurality of notifications based on the respective context data includes determining the order of display of the plurality of notifications based upon the sensor data and the respective context data for each respective notification of the plurality of notifications.

5. The method of claim 3, wherein the sensor data includes data from a location sensor.

6. The method of claim 1, wherein the respective context data includes at least one of a location data, time, a calendar event, a message, call answering statistics, a recently visited website, a recent search term, a recently called number, or browsing history.

7. The method of claim 1, wherein determining the order of display of the plurality of notifications includes prioritizing the at least one notification ahead of at least one other notification of the plurality of notifications based on the respective context data for the at least one respective notification.

8. The method of claim 1, wherein determining the respective context data for each of the plurality of notifications comprises:
   associating each respective notification of the plurality of notifications with one or more remote electronic devices; and
   identifying one or more contextual events associated with the one or more remote electronic devices.

9. An electronic device comprising a processor configured to:
   identify a plurality of notifications;
   determine for each respective notification of the plurality of notifications, respective context data, wherein a respective priority of at least one respective notification of the plurality of notifications is based on at least one respective weight assigned to the respective context data, wherein respective context data for the at least one notification of the plurality of notifications is based, at least in part, on a contextual event, the contextual event being at least one of:
      a scheduled event associated with the electronic device and the one or more remote electronic devices, or
      a communication received at both the electronic device and the one or more remote electronic devices;
   determine an order of display of the plurality of notifications based on the at least one respective weight of the respective context data for the at least one respective notification of the plurality of notifications; and
   output, for display, the plurality of notifications based on the order of display.

10. The electronic device of claim 9, wherein the plurality of notifications comprises at least one of a call notification, a message notification, an update notification, a calendar notification, an email notification, or notifications from websites.

11. The electronic device of claim 9, further comprising at least one sensor configured to determine sensor data of the electronic device.

12. The electronic device of claim 11, wherein the sensor data includes data from a location sensor.

13. The electronic device of claim 11, wherein the processor is further configured to determine the order of display of the plurality of notifications based upon the sensor data and the respective context data for each respective notification of the plurality of notifications.

14. The electronic device of claim 9, wherein the respective context data includes at least one of a location data, time, a calendar event, a message, call answering statistics, a recently visited website, a recent search term, a recently called number, and browsing history.

15. The electronic device of claim 9, wherein determining the order of display of the plurality of notifications includes prioritizing the at least one notification ahead of at least one another notification of the plurality of notifications based on the respective context data for the at least one respective notification of the plurality of notifications.

16. The electronic device of claim 9, wherein the processor is further configured to associate each respective notification of the plurality of notifications with one or more remote electronic devices, and to identify one or more contextual events associated with the one or more remote electronic devices.

17. The electronic device of claim 16, wherein the electronic device is at least one of a wireless communication device, personal digital assistant, a cellular telephone, a messaging device, a mobile data terminal, a computer, or a gaming device.

* * * * *